United States Patent [19]

Gailbreath et al.

[11] Patent Number: 4,603,317
[45] Date of Patent: Jul. 29, 1986

[54] ELECTRICALLY-OPERATED BACKUP ALARM

[75] Inventors: Samuel H. Gailbreath; Ronald K. Whitaker, both of Boise, Id.

[73] Assignee: Electronic Controls Co., Boise, Id.

[21] Appl. No.: 440,088

[22] Filed: Nov. 8, 1982

[51] Int. Cl.$^4$ ............................................. B60Q 1/26
[52] U.S. Cl. .................................. 340/70; 340/384 E; 331/108 D; 331/111; 381/108
[58] Field of Search .................. 381/57, 71, 104, 108, 381/107; 340/70, 384 E, 384 R; 331/108 D, 111, 143

[56] References Cited

U.S. PATENT DOCUMENTS

| | | | |
|---|---|---|---|
| 3,173,136 | 3/1965 | Atkinson | 331/47 X |
| 4,061,874 | 12/1977 | Fricke et al. | 381/57 |
| 4,247,955 | 1/1981 | Weidemann | 381/57 X |
| 4,254,303 | 3/1981 | Takizawa | 381/107 |

Primary Examiner—John W. Caldwell, Sr.
Assistant Examiner—Tyrone Queen
Attorney, Agent, or Firm—F. D. La Riviere; William F. Herbert

[57] ABSTRACT

An improved electrically-operated backup alarm for use on mobile construction and industrial machinery, including selectable lower and higher loudness levels, automatically adjustable loudness level with respect to varying ambient noise level in which the alarm is operating, high and low frequency compensation to substantially eliminate high and low frequency signal components of the sensed ambient noise, and compensation for responding to transient signal components of the sensed ambient noise.

15 Claims, 5 Drawing Figures

ELECTRICALLY-OPERATED BACKUP ALARM

BACKGROUND AND SUMMARY OF THE INVENTION

Backup alarm devices are required for mobile construction, mining and industrial equipment. Both mechanically operated and electrically operated backup alarm devices are available for such equipment to provide a sound in the audible range of human hearing to warn persons in the immediate area that the vehicle is backing up and that the operator of that vehicle may not see or be able to maneuver around those persons.

Prior art backup alarms include those described in U.S. Pat. Nos. 3,173,136 (Atkinson), 2,517,629 (Buys et al), 2,462,532 (Morris), and 2,431,117 (Hadley). Atkinson shows a backup horn wherein the volume of the horn is automatically variable depending upon the background noise level, and wherein the horn itself is used alternately as a horn and a microphone for determining the background noise.

Buys, et al teaches a volume control system for sound reproduction in railway yards utilizing two microphones separate from at least one loudspeaker. Morris describes a sound system which compensates for variable noise levels, also utilizing a microphone separate from one or more loudspeakers. Hadley provides a backup warning device which emits an intermittent signal at a frequency proportional to the speed of a rearwardly moving vehicle.

Modern prior art electrically-operated backup alarm usually comply with criteria and standards promulgated by governmental agencies, as well as self-regulating industrial organizations. Section 1926.601 of the Department of Labor, Occupational Safety and Health Standards entitled "motor vehicles" requires any motor vehicle having an obstructed view to the rear be equipped with a reverse signal alarm "audible above . . ." or " . . . distinguishable from the surrounding noise level." Department of Interior, Mining Enforcement and Safety Administration section 77.410, requires an automatic warning device where certain mobile equipment " . . . is put in reverse." The U.S. Army Corps of Engineers manual section EM 385-1-1 requires a reverse signal alarm on all self-propelled construction equipment (with certain exceptions), which operates automatically when the equipment begins backward motion, and which emits an audible alarm sufficiently distinct to be heard under prevailing conditions.

S.A.E. (Society of Automotive Engineers) Standard J994b recommends criteria for electrically operated backup alarm devices on construction and industrial machinery including, inter alia, the frequency and loudness level of such alarms. The specified sound of a backup alarm is intended to be distinguishable from, and loud enough to exceed, the ambient noise level of other equipment and noise sources in the immediate area.

The sound level in typical prior art electrically operated backup alarms is preset. While the sound level of some alarms may be manually adjusted, most such alarms provide sound level at only one level, irrespective of ambient noise.

The sound level of prior art alarms can be unnecessarily loud in the absence of other heavy equipment or noise sources in the immediate area.

The U.S. Environmental Protection Agency (EPA) has set noise standards for portable air compressors, as well as medium and heavy trucks. Wheel and crawler tractors were identified as major noise sources on May 25, 1975, with the publication of an identification report in the Federal Register. Since that time, the EPA has continued to consider noise emission regulations for construction equipment. It has been determined that a contribution to hearing impairment begins with constant exposure to noise levels in excess of 62 db.

Operators of such machinery also simply tire of listening to such alarm devices when the machinery they are operating back up frequently. If the output sound level of such alarms are not or cannot be adjusted they are frequently modified or even sabotaged to relieve operators of the annoying and potentially disabling noise. Since such backup alarm devices are important for the safety and welfare of all personnel in the immediate areas of mobile construction equipment and industrial machinery, the risk of injury to such personnel is increased if such backup alarms are disabled or otherwise modified so they cannot be heard above ambient noise levels.

In addition to the obvious cost of replacement, insurance underwriters may increase their premiums to cover the added risk of injury to persons in the immediate area of the machinery if the underwriters believe workers disable or modify such alarms, or if they believe that workers may become physically impaired by sound levels of such alarms. Without operable alarms on machinery required to have them, owners, contractors and employers may be in violation of federal law.

An electrically operated backup alarm device constructed in accordance with the present invention provides sound warning at pre-selectable levels when mobile equipment is operating in reverse, and senses ambient noise levels to automatically modulate the loudness of the sound it emits, relative to the sensed ambient noise level. The device automatically limits the maximum and minimum sound level it emits to recommended or required standards, and automatically provides substantially linear increase or decrease of emitted sound level between the maximum and minimum limits at a substantially constant level above the sensed ambient noise.

The emitted sound level of the alarm of the present invention is set at recommended or required frequencies within the human hearing range. The sound heard is distinguishable from surrounding noise because the signal controlling the frequency of emitted sound is also selectable in the present invention.

To reduce ambient noise sensing errors, the alarm device of the present invention is compensated at low frequencies to eliminate such errors arising from vibration of the sensor itself. The device is compensated at high frequencies, i.e. above human hearing range, to eliminate errors arising from spurious emissions from vehicle ignition systems and the like. The device is further compensated to control the emitted sound level in the presence of high transient ambient noise, i.e. within human hearing range, which may be produced by pile drivers, stamping machines and other similar sources.

The present invention includes an oscillator, an audio transducer for emitting and sensing sound and audio signal conditioning electronic circuitry. The alarm further includes circuitry to adjust the duty cycle for emitting and sensing sound level and suitable delay circuitry to avoid sensing its own echo in confined spaces.

The present invention is useful in backup alarms for mobile construction and industrial equipment, and may be useful in other alarm applications. In fact, any application in which the amount of amplification of an electromagnetic wave, whether in the audio region or not, is modulated relative to sensed ambient stimulus in which the device is operating may utilize the principles of the present invention.

DESCRIPTION OF THE PREFERRED EMBODIMENT

Figure 1:
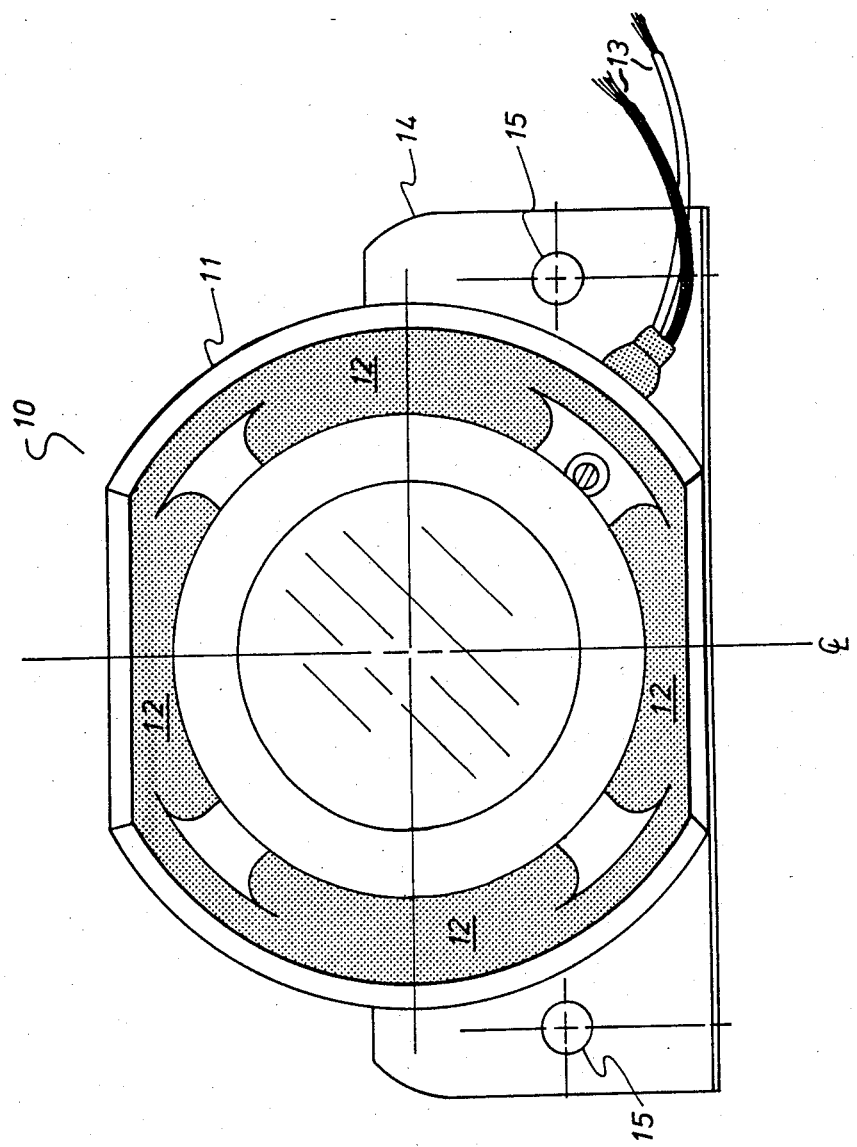
FIG. 1 is a front view of an electrically operated backup alarm constructed according to one embodiment of the present invention.

Referring to FIG. 1, electrically operated backup alarm device 10 constructed according to the present invention includes housing 11 having vents 12 for emitting sound and sensing ambient sound and electrical connection wires 13 for coupling to the electrical system of the mobile construction or industrial equipment on which alarm device 10 is mounted. Typically, alarm device 10 is mounted rearwardly facing on, at or near the rear of the equipment by means of mounting flange 14, which has mounting bolt holes 15.

The electronics module, comprising circuit board(s) with integrated circuits and other discrete components mounted thereon, are epoxy encapsulated within housing 11. The ruggedized packaging is designed to provide for operation of the alarm over the temperature range −40° F. to 175° F.

Electrical connection of alarm device 10 to the equipment may vary with the type of equipment and its electrical system and the preferences of the user. In some cases, it is preferable for the electronics of the alarm to be active as long as the vehicle is running and the audio transducer of the alarm to be activated when the vehicle is backing up. In the present case, the electrical system of the alarm and the audio transducer are both activated when the vehicle is operated in reverse.

Figure 2:
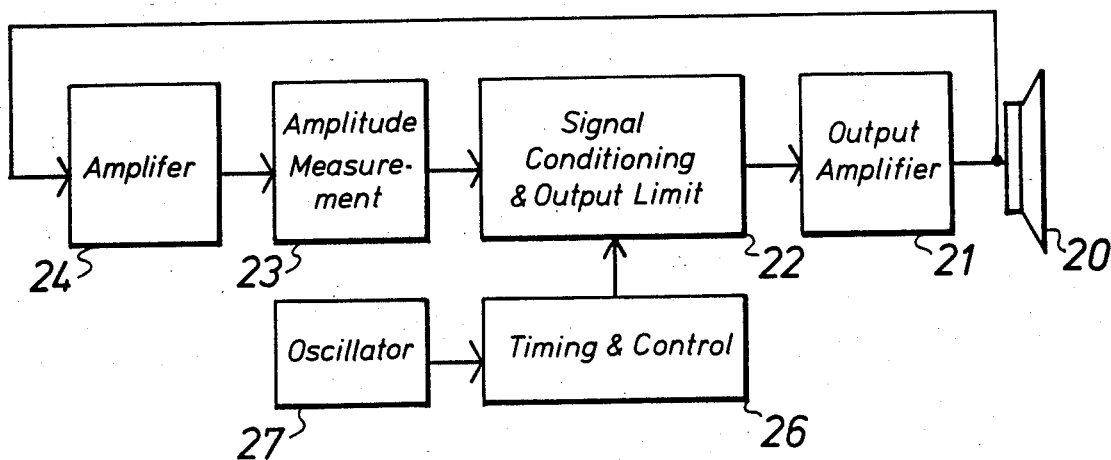
FIG. 2 is a block diagram of an electrically operated backup alarm constructed according to the preferred embodiment of the present invention.

Referring now to FIG. 2, the electrical and sound emitting and sensing system of alarm device 10 includes audio transducer 20 coupled to output amplifier 21 and amplifier 24. Amplifier 24 is also coupled to amplitude measurement circuit (AMC) 23, which is coupled to signal conditioning and output limits (SCOL) circuit 22. Oscillator 27 is coupled to SCOL 22 via timing and control circuit (T&C) 26.

Figure 3:
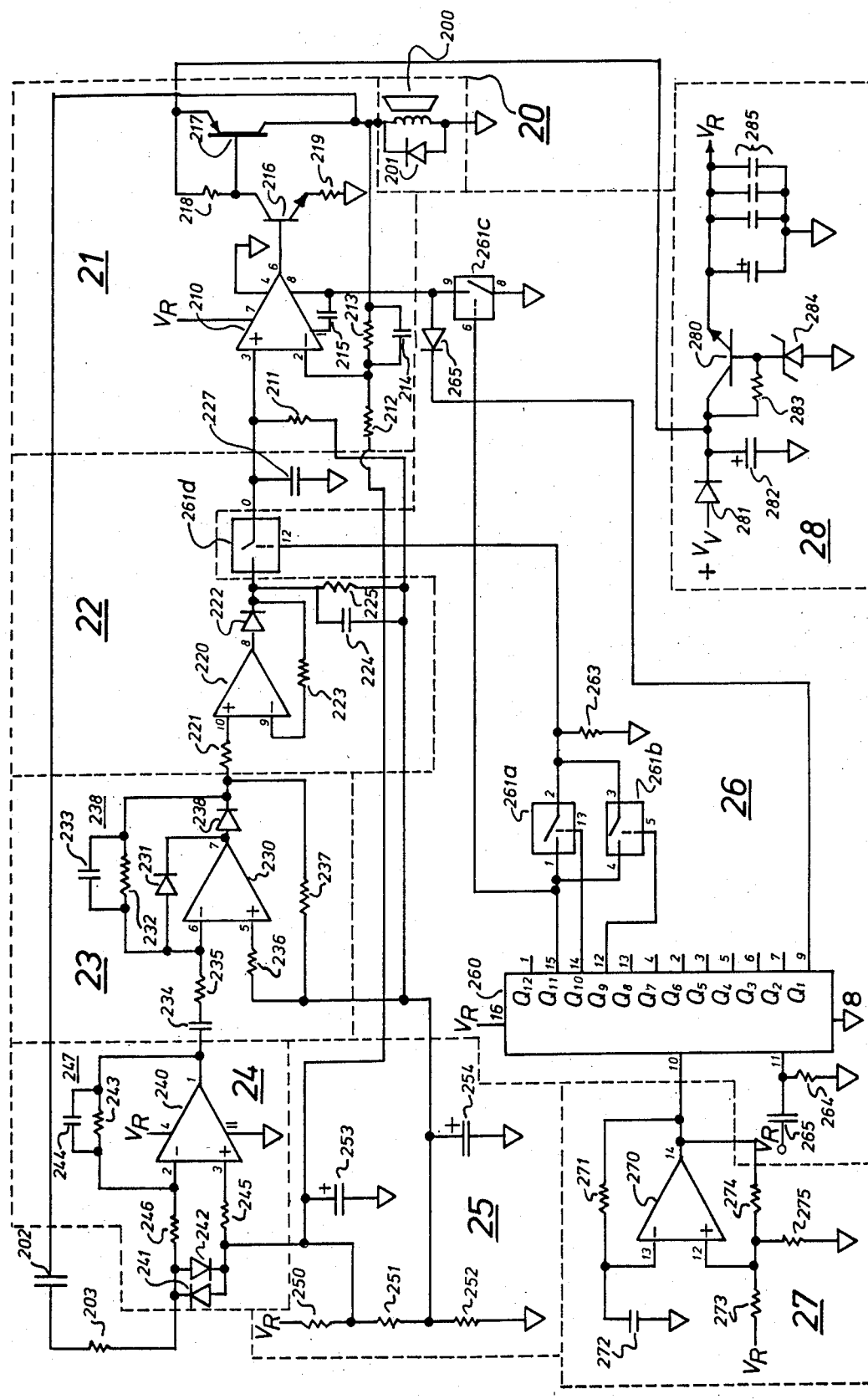
FIG. 3 is a schematic circuit diagram of the electrical and sound emitting and sensing system of the electrically operated backup alarm of FIG. 1.

Referring to FIG. 3, amplifier 24 comprises operational amplifier (OA) 240, input clamping diodes 241 and 242, and RC network 247. Diodes 241 and 242 protect OA 240 from being overdriven when transducer 20 emits sound. Network 247, consisting of resistor 243 and capacitor 244 coupled between the output and inverting input 2 of OA 240, provides signal conditioning for amplifier 24. As is well-known, the gain of amplifier 24 at frequencies in the pass band is set by the ratio of value of resistor 243 to resistor 246 and resistor 203.

The other input of OA 240 is biased to a pre-selected bias voltage via resistor 245. The bias voltage is set by relative value of resistors 250, 251 and 252 of biasing network 25. Biasing network 25 also provides bias voltage for other stages of the electrical circuit of the present invention.

Regulated voltage, $V_R$, is provided by regulator 28 of well-known design, which converts the relatively unregulated voltage of the equipment $V_v$, on which alarm device 10 is mounted to a value approximately equal to 0.7V above the value of zener diode 284. Diode 281 provides reverse polarity protection.

With continuing reference to FIG. 3, half wave rectifier 23 comprises OA 230 AC-coupled to the output of amplifier 24 via capacitor 234 and resistor 235. OA 230 is biased via resistor 236. RC network 238 comprises resistor 232 and capacitor 233 which provides signal conditioning for rectifier 23. Rectifier 23, in typical fashion, produces a positive-going signal in response to a negative-going signal applied to resistor 235, and produces substantially no signal in response to positive-going signals at resistor 235.

Peak detector 22 includes OA 220 the non-inverting input of which is DC coupled to the output of rectifier 23 via resistor 221. The output of OA 220 is coupled to capacitor 227 via diode 222 and bilateral switch 261d. When switch 261d is closed, capacitor 227 charges to the voltage level at the cathode of diode 222. Bias at the inverting input of OA 220 is provided by resistors 223 and 225 when switch 261d is open. The operation of switch 261d is described elsewhere in this specification.

Referring again to FIG. 3, output amplifier 21 includes OA 210, the non-inverting input of which is DC coupled to capacitor 227 and to bias network 25 via resistor 211. Inverting input 2 of OA 210 is also coupled to bias network 25 via resistor 212 and to transducer 20 via resistor 213. The output of OA 210 is DC coupled to transistor 216 in well-known voltage amplifier configuration, the output of which is coupled to transducer 200 via transistor 217. The voltage gain of the transistor amplifier is controlled by the ratio of the value of resistor 218 to resistor 219.

The selection of resistors 212 and 213 and the bias voltages connected to resistor 212 and OA 220 determines both the minimum and maximum sound level output by speaker 200. The voltage across speaker 200, $V_S$, is controlled by the voltage to which capacitor 227 charges, $V_c$. $V_c$ comprises the total of bias voltage plus voltage representing the peak ambient noise sensed by speaker 200. Thus, $V_c$ equals the bias voltage connected to OA 220 in the absence of sensed ambient noise. When ambient noise level is high, $V_c$ is approximately equal to $V_R$, the regulated voltage. Referring again to FIG. 3, if bias voltages $V_A$ and $V_B$ are given by $$V_A = V_R \frac{(R251 + R252)}{(R250 + R251 + R252)} \text{ and}$$

$$V_B = V_R \frac{(R252)}{(R250 + R251 + R252)},$$

[Rxxx refer to resistors indicated in FIG. 3] then $$V_S = V_C\left(1 + \frac{R213}{R212}\right) - V_A\left(\frac{R213}{R212}\right). \quad (1)$$

Since $$V_C = K_A V_{ip} + V_B,$$

where $K_A$ is the total gain of amplifier 24, half-wave rectifier 23 and peak detector 22, which is given by $$K_A = \left(\frac{R243}{R203 + R246}\right)\left(\frac{R232}{R235}\right),$$

and $V_{ip}$ is the value of the peak sensed ambient noise stored by $V_C$, the minimum sound level produced by speaker 200 is given by $$V_{SMIN} = V_B\left(1 + \frac{R213}{R212}\right) - V_A\left(\frac{R213}{R212}\right)$$

where $V_{ip}=0$. Similarly, the maximum sound level produced by speaker 200 is given by $$V_{Smax} = V_R\left(1 + \frac{R213}{R212}\right) - V_A\left(\frac{R213}{R212}\right)$$

where $V_C = V_R$.

The sound level of alarm device 10 in db, $A_{db}$ is related to $V_S$ by $$A_{db} = 20 \log (K_L * V_S),$$

where $K_L$ is the speaker constant related to the gain of the speaker as it converts voltage to sound. The voltage representing the sensed ambient noise in db, $N_{db}$, is given by $$N_{db} = 20 \log (K_S * V_{ip}),$$

where $K_S$ is the speaker constant related to the gain of the speaker as it converts sound to voltage in the microphone mode. Therefore, $$V_{ip} = 10(N_{db}/20)/K_S,$$

then $$A_{db} = 20 \log (K_L(V_{ip}K_A(1+R_{213}/R_{212}) + V_B(1+R_{213}/R_{212}) - V_A(R_{213}/R_{212})))$$

It should be noted that the term $$K_A\left(1 + \frac{R213}{R212}\right)$$

substantially determines the amount of sound level, $A_{db}$, above ambient noise produced by alarm device 10 for given speaker constants $K_L$ and $K_S$.

Oscillator 27 comprises OA 270, resistors 271, 273, 274 and 275, and capacitor 272. The values of these components are selected for a signal frequency of approximately 2 KHz. The output signal is coupled to output amplifier 21 via timing and control network 26.

Transducer 20, comprises speaker 200, for alternately emitting alarm sound and sensing ambient noise and freewheeling diode 201. Speaker 200 is connected to the output of output amplifier 21 for receiving electrical signals representing alarm sound, and to the inverting input of amplifier 24 via capacitor 202 and resistor 203 for transmitting thereto electrical signals representing sensed ambient noise.

Figure 4:
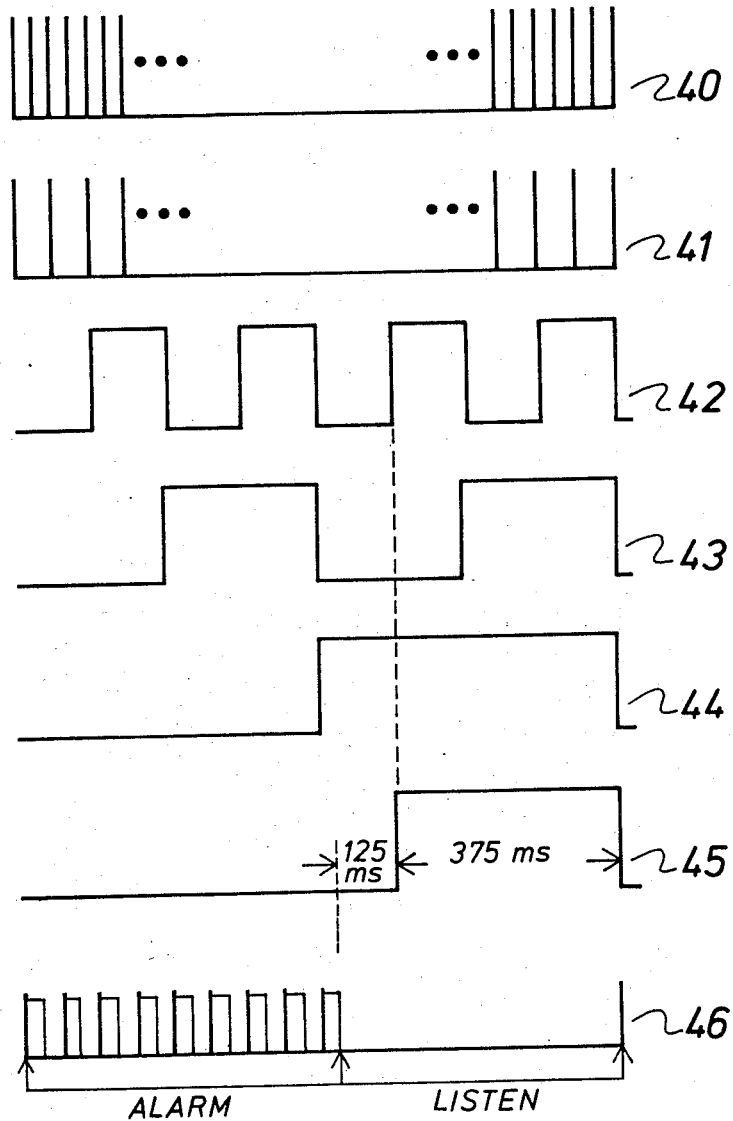
FIG. 4 is a timing diagram of selected signals produced by the circuit of FIG. 3.

Timing and control circuit 26 controls operation of alarm device 10. The circuit comprises switching logic circuit (SLC) 260, resistors 263 and 264, capacitor 265 and bilateral switches 261a, b, c, d. Referring to FIGS. 3 and 4, oscillator 27 provides 2 KHz signal 40 at input 10 of SLC 260. SLC 260 divides the oscillator signal by 2 and provides 1 KHz signal 41 at output $Q_1$ thereof for coupling to transducer 20 via diode 265 to input 8 of OA 210 of output amplifier 21.

Signal 41 determines the frequency of emitted sound and signal 44 determines the rate of sound emissions. The loudness of alarm sound is nominally 87 db. Loudness is set by the voltage to which capacitor 227 is charged. At nominal sound levels, the voltage is about 2 volts. Subject to minimum and maximum limits as that voltage changes, the loudness of alarm device 10 changes accordingly. Thus, as the ambient noise level increases, the voltage to which capacitor 227 is charged increases and the loudness of the sound produced by device 10 increases. Conversely, as ambient noise level decreases, the voltage to which capacitor 227 is charged decreases and the loudness of the sound produced by device 10 decreases.

SLC 260 also provides selectively timed switching signals 42, 43 and 44 for control of bilateral switches 261a, b, c and d. As illustrated by wave form 46 of FIG. 4, alarm device 10 provides a 1 KHz alarm sound at a 1 Hz rate by applying signal 44 to switch 261C which alternately enables and disables OA 210. When OA 210 is enabled, device 10 is in alarm mode; when OA 210 is disabled, device 10 is in listen mode. Signal 44 results from twice dividing signal 42 by 2.

During listen mode, signals 42, 43 and 44 are combined according to the Boolean expression (Signal 43·Signal 44)+(Signal 42·Signal 44)

by the coupling of bilateral switches 261 a and b to give control signal 45. Control signal 45 is applied to bilateral switch 261d. During alarm mode bilateral switch 261d is open, and transducer 20 of device 10 provides alarm sound determined by the voltage on capacitor 225 when OA 210 is enabled.

During listen mode, transducer 20 senses ambient noise. Since OA 210 is disabled, thus disabling transistors 216 and 217, signals representing sensed ambient noise are transmitted to amplifier 24 via capacitor 202 and resistor 203. Those signals, when acted upon by amplifier 24, half wave rectifier 23 and peak detector 22, ultimately set the voltage to which capacitor 227 is charged. Thus, capacitor 227 is charged to a new voltage when switch 261d is closed. The new voltage determines the loudness of the next emission of alarm sound.

As mentioned before, switch 261d is controlled by control signal 45. Control signal 45 may be changed to suit ambient conditions by varying the frequency and/or the relationship of the signals combined by bilateral switches 261a and b. Since tranducer 20 senses all ambient noise including an echo of the sound it previously emitted, if the equipment on which the alarm is mounted is operating in an enclosed area, control signal 45 may be changed to delay charging of capacitor 227 past the average time it takes for the echo to reach transducer 20 in that area.

Of course, control signal 45 also may be arbitrarily set for nominal conditions as shown in FIG. 4. Thus, switch 261d is closed 125 milliseconds (ms) after device 10 stops emitting sound. Such 125 ms delay corresponds to an echo received from about 70 feet away from transducer 20.

Capacitor 265 and resistor 264 of timing and control circuit 26 provide input for resetting SLC 260 to a listen state when power is first applied. Resistor 263 provides a ground path for 261d when both 261a and 261b are open.

Referring again to FIG. 3, OA 240, 230, 220, and 270 may be the same or similar low power, high gain operational amplifier, designed to operate from a single power supply, as the type LM124 currently marketed by National Semiconductor. The LM124 comprises four independent amplifiers in one component package. OA 210 may be a high input impedance, low input current operational amplifier of the type currently offered on the open market as an CA3140 by RCA.

Switching logic circuit 260 may be like any counter and divider such as the RCA CD4040. Bilateral switches 261a, b, c and d may be any controllable, bilateral switch or even a relay. The preferred embodiment of the present invention utilizes a semiconductor switch having low on-state resistance which is constant over a large range of input signals such as the RCA CD4066.

Other components of the alarm device 10 are well-known to those skilled in the art. Transistor 216 is a type 2N2222, transistor 280 is a type 2N3440 and transistor 217 is a type MJE702 (manufactured by Motorola). Speaker 200 of transducer 20 is any 8 ohm speaker capable of producing the specified sound level. Diodes 231, 238, 222, 265, 241 and 242 are any small signal diodes such as 1N914. Diodes 201 and 281 are any high voltage, high current diode, such as a 1N4006. Zener diode 284 is any 10 V, one watt zener diode commonly available. The values of resistors and capacitors are selected in accordance with descriptions elsewhere in this specification.

Figure 5:
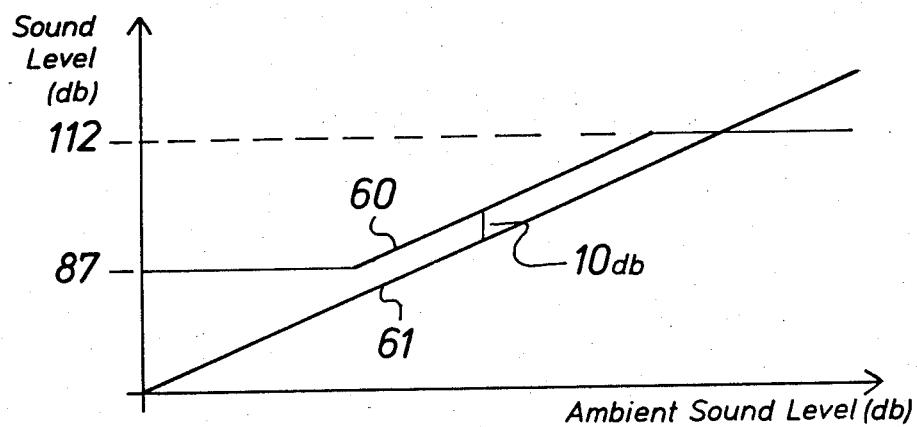
FIG. 5 is a graph of sound level emitted by the backup alarm of FIG. 2 versus ambient sound level.

Referring now to FIG. 5, the ambient sound level in db in which alarm device 10 is operating is plotted against the sound level emitted by alarm device 10. Curve 60 characterizes the performance of the alarm of the present invention in the presence of ambient noise represented by Curve 61. Alarm device provides sound at no lower a level than approximately 87 db, no higher than about 112 db and at consistently 10 db above the ambient noise between those limits. These operational characteristics are established and controlled by selecting the voltage to which capacitor 227 is charged.

Selection of the minimum and maximum sound levels was described earlier in this specification. The alarm device of the present invention provides a substantially constant sound level 10 db above the ambient noise level between such minimum and maximum levels. That sound level above ambient is determined by the combined gains of any one of output amplifier 21, SCOL 22, AMC 23 and amplifier 24. Changing the gain of any of these portions of device 10 will affect the difference in sound level between the alarm sound and the ambient noise in which it is operating. For device 10, changing the gain of both amplifier 24 and AMC 23 is the preferred method of changing such difference. For the present invention, increasing the gain increases the alarm sound level above ambient noise.

The response to ambient noise of alarm device 10 varies with the frequency content thereof and the response characteristics of speaker 200 when used as a microphone. However, in the frequency range of interest for such alarms according to SAE recommended practices, an alarm constructed according to the present invention will emit sound at a level approximately 10 db above ambient noise when the level of that noise ranges from 77 to 102 db.

Alarm device 10 is frequency compensated with respect to sensed ambient noise. Low frequency compensation is provided by selecting the values of resistors 203, 246, 235 and capacitors 202 and 234. Such compensation precludes vibration of transducer 20 from falsely setting too high a loudness level for the next emission of the alarm.

The configuration of output amplifier 21, transistor 217 in particular isolates speaker 200 from supply voltage, $V_p$. This provides immunity from transients that may appear on the supply voltage which could be sensed incorrectly as ambient noise.

Similarly, device 10 is also high frequency compensated by setting the values of RC networks 238 and 247 to substantially eliminate setting the loudness level of device 10 too high because of spurious radio frequency emissions from vehicle ignition and the like. For the preferred embodiment of the present invention, the values of resistors 232 and 243 and capacitors 233 and 244 are set to substantially eliminate ambient noise signal components having frequencies above 8 KHz.

Finally, the present invention is compensated for ambient noise which includes high transient signal components such as are produced by pile drivers and the like. In particular, device 10 is designed to assure adequate sound level above aperiodic transients, even if only some of those transients are actually sensed. Since capacitor 227 discharges toward approximately 2 volts, the nominal operating voltage level, through resistor 225 when switch 261d is closed. Thus the value of that resistor will control the rate of decay of voltage at the input of output amplifier 21, especially if it is much lower than resistor 211. Therefore, a single or aperiodic transient occurring in the ambient noise will continue to affect the level setting function of capacitor 227 for as many listen modes as occur before capacitor 227 fully discharges to the nominal operating voltage level from the voltage to which it was caused to charge by the transients.

We claim:

1. An electrically-operated alarm device comprising:
oscillator means for producing electromagnetic signals;
signal conditioning means coupled to the oscillator for processing signals received therefrom;
power amplifier means coupled to the signal conditioning means for amplifying signals received therefrom; and
audio transducer means coupled to the amplifier means for emitting sound at preselected loudness levels in response to signals produced by the signal conditioning means, for sensing ambient noise, and for producing signals in response to sensed ambient noise in the environment in which the alarm device is operating;

said signal conditioning means also producing control signals for automatically limiting the lower and higher loudness levels of the emitted sound at preselectable levels, and for producing loudness control signals to automatically adjust the loudness level of sound emitted by the audio transducer means to a substantially constant preselectable level above a preselectable range of sensed ambient noise in response to signals representing sensed ambient noise received from the audio transducer means.

2. An alarm device as in claim 1 wherein the signal conditioning means includes means for substantially eliminating low frequency signal components of the ambient noise sensed by the audio transducer means.

3. An alarm device as in claim 1 wherein the signal conditioning means includes means for substantially eliminating high frequency signal components of the ambient noise sensed by the audio transducer means.

4. An alarm device as in claim 1 wherein the signal conditioning means includes means for controllably responding to transient signal components of the ambient noise sensed by the transducer means.

5. An alarm device as in claim 1 wherein the signal conditioning means comprises:
amplifier means coupled to the audio transducer means for receiving therefrom signals representing the sensed ambient noise in which the audio transducer is operating and for amplifying said signals;
rectifier means coupled to the amplifier means for rectifying said signals received therefrom;
timing and control means coupled to the oscillator means for producing control signals in response to electromagnetic signals received therefrom; and
peak detector means coupled to the rectifier means and to the timing and control means for producing loudness control signals in response to said signals and control signals received, respectively, therefrom.

6. An alarm device as in claim 5 wherein the signal conditioning means further includes means for eliminating loudness control signals caused by vibration of the device.

7. An alarm device as in claim 5 for use on a vehicle wherein the signal conditioning means further includes means for eliminating loudness control signals caused by transient electrical signals produced by the vehicle.

8. An alarm device for operation in an environment having ambient noise, said device comprising:
sound-emitting means for emitting sound at a preselectable loudness level during a first preselected time period;
signal conditioning means for producing loudness control signals;
timing and control means coupled to the sound-emitting and signal conditioning means for controlling the sound-emitting means during a second preselected time period sequentially following said first preselected time period;
said signal conditioning means adjusting the loudness level of sound to be emitted from the sound-emitting means during the next succeeding first preselected time period in response to said loudness control signals representing sensed ambient noise during a third preselected time period sequentially following the second preselected time period;
said timing and control means causing the first preselected time period to successively and sequentially follow the third preselected time period.

9. An alarm device as in claim 8 wherein the first preselected time period is set to approximately one-half second, the second preselected time period is set to approximately one-tenth of a second, and the third preselected time period is set to approximately four-tenths of a second by the timing and controls means.

10. An alarm device as in claim 8 wherein the signal conditioning means automatically adjusts the loudness level of the sound emitted by the sound-emitting means to a substantially constant preselectable level above a preselectable range of sensed ambient noise.

11. An alarm device as in claim 8 wherein the signal conditioning means automatically limits the lower and higher loudness levels of the sound emitted by the sound-emitting means.

12. An alarm device as in claim 1 wherein the signal conditioning means includes means for selecting the preselectable range of sensed ambient noise to be approximately 25 db, and for selecting the substantially constant, predictable loudness level of emitted sound to be approximately 10 db above the sensed ambient noise.

13. An alarm device as in claim 1 wherein the lower loudness level of sound emitted by the sound-emitting means is limited to approximately 87 db, and the higher loudness level of sound emitted by the sound-emitting means is limited to approximately 112 db by the signal conditioning means.

14. An alarm device as in claim 5 wherein the signal conditioning means further includes means for selectably delaying automatic adjustment of the loudness level of the sound emitted by the audio transducer means for a time period longer than the time it takes an echo of the emitted sound to reach the audio transducer means.

15. Alarm device as in claim 14 wherein the means for selectably delaying automatic adjustment of the loudness level sets the time period to approximately one-tenth of a second.

* * * * *